Oct. 3, 1950             C. C. CRISS             2,524,163
STATIC GROUNDING DEVICE FOR VEHICLES
Filed March 31, 1949
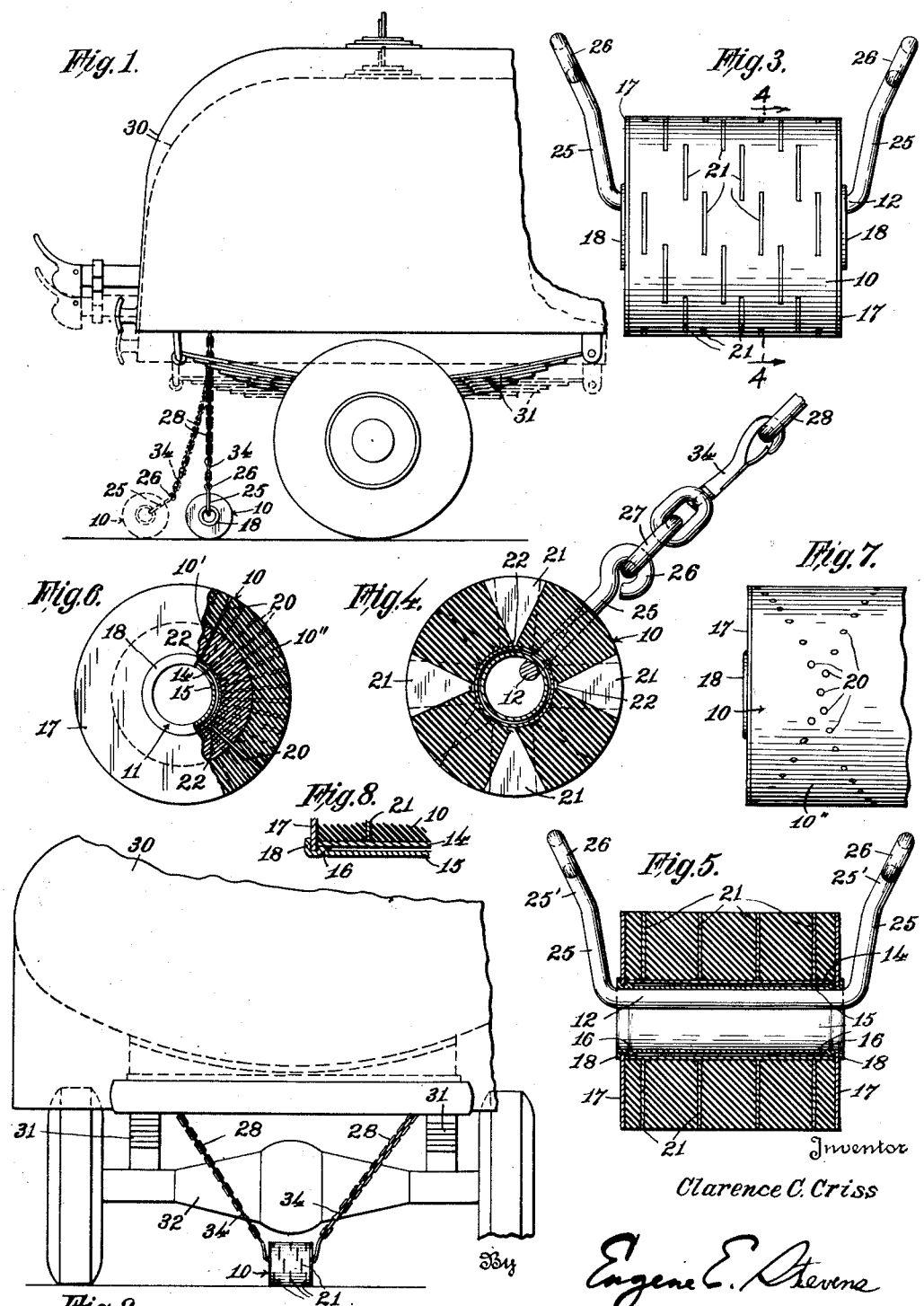
Inventor
Clarence C. Criss
Eugene E. Stevens
His ATTORNEY Patented Oct. 3, 1950

2,524,163

UNITED STATES PATENT OFFICE 2,524,163

STATIC GROUNDING DEVICE FOR VEHICLES

Clarence C. Criss, Arkansas City, Kans.

Application March 31, 1949, Serial No. 84,547

5 Claims. (Cl. 175—264)

This invention relates to static grounding devices for vehicles such as rubber tired tank trucks used for transportation of gasoline or other inflammable or explosive products.

The usual means employed for the above stated purpose consists of a chain secured at one end to the vehicle and having the other or free end contact and drag upon the ground. This has been found to be unsatisfactory inasmuch as the lower portion of the chain which drags upon the ground rapidly wears away, and the end links which engage the ground become separated from the upper portion of the chain, thereby rendering the device useless.

Applicant is aware that various means have been devised for the purpose of overcoming this defect; but so far as applicant is aware, such devices have not fully met the necessary requirements especially as to maintaining a constant electrical contact with the ground under all road conditions, and have not had the long-wearing quality essential to devices designed for this purpose. Also, such proposed devices frequently produce a great amount of sparks as they drag along the roadway, which is dangerous, especially if the tank should leak; and frequently the devices are too expensive to manufacture and maintain in service.

The object of the present invention is to provide a device of the class under consideration which shall be of such construction and arrangement as to constantly maintain a closed and adequate contact with the ground under practically all conditions.

A further object of the invention is to provide a grounding device of the type mentioned which will be long-wearing and of low cost to manufacture.

A further object of the invention is to provide a static grounding device for vehicles which will not spark due to frictional contact with the roadway.

A still further object of the invention is to provide a grounding device as mentioned having a flexible connection with the tank, and of such construction and arrangement that it will not become entangled with the flexible connecting element or with any portion of the truck.

Other objects will appear hereinafter.

With the above stated objects in view, the device embodying the present invention comprises generally a substantially cylindrical roller formed of a long-wearing, insulating material having a metallic tubular core, a plurality of conductor elements extending from the outer surface of the roller to said core, a U-shaped bar extending loosely through the said core, and flexible conducting elements connecting the respective ends of said bar to laterally spaced points on a vehicle.

The invention further consists in various details of construction and arrangements of parts, as will be described hereinafter and particularly pointed out in the claims.

The invention will be more readily understood by reference to the accompanying drawings forming a part of this specification and in which—

Fig. 1 is a side elevation of the rear end of a truck equipped with a grounding device embodying the present invention and illustrating, in full and dotted lines respectively, the positions of the body of the tank with relation to the ground when empty and when filled;

Fig. 2 is a fragmentary rear elevation of the truck equipped with the grounding device;

Fig. 3 is an elevation of the ground-contacting roller upon an enlarged scale;

Fig. 4 is a section on substantially the line 4—4 of Fig. 3 and illustrating details of the means for connecting the roller to the vehicle;

Fig. 5 is a longitudinal section of the roller, together with the U-shaped bar;

Fig. 6 is an end view, partly in section, of a modified form of the roller element;

Fig. 7 is a fragmentary elevation of the same; and

Fig. 8 is a detail, upon an enlarged scale, illustrating the relation of the several roller elements.

Referring to the drawings, the preferred form of the ground-engaging roller is illustrated in detail in Figs. 3, 4, 5 and 8, and comprises generally a cylindrical body 10 which is formed of suitable insulating material, and provided with a tubular core 11 through which a supporting bar 12 extends, as will be fully described hereinafter.

The core 11 preferably consists of a tubular metal nave 14 upon which the body 10 is fixed, and an inner tubular hub 15 which is preferably rotatable with relation to the nave 14 in order to lessen the frictional wear of the body 10 upon the roadway.

The hub 15 is formed adjacent its ends with circumferential beads 16 against which annular end discs 17 are seated; and said discs are held in position by end flanges 18 formed by upsetting or swaging the ends of the hubs 15, as shown in Figs. 5 and 8.

The roller body 10, which is preferably cylindrical, is formed of suitable insulating or non-conducting material such as rubber, rubber composition, synthetic rubber or similar material which will resist wear; and the diameter of the roller body is preferably the same as that of the end discs 17 so that the peripheries of the discs 17 and roller 10 are flush.

The nave 14 rides loosely upon the beads 16, thereby further reducing the friction between the nave and the hub 15; and said nave, together with the roller body 10 are held longitudinally in position of the hub 15 by the discs 17 between which they are free to rotate.

In order to maintain electrical contact between the core 11 and the roadway, a plurality of contact members are extended through the roller 10 from the periphery thereof to the nave 14. These contact members are preferably of non-pyrophoric metal to avoid sparking as the device travels along the roadway; and are usually inserted by being driven radially through the roller 10. The contact members may be of any convenient form, such as nails or wire sections 20 as illustrated in Figs. 6 and 7, but are preferably triangular pieces 21 made of sheet metal of sufficient gauge, as shown in Figs. 3, 4 and 5. By using the triangular members 21, and arranging the same with the breadth thereof extending peripherally of the roller, elongated contacts are provided on the road-engaging face of the roller, so that fewer members are required to maintain constant electrical contact with the roadway than when the wire members 20 are used. This is particularly true when the members 21 are arranged with their edges in radially overlapping relation as shown in Fig. 3. When the contact members 20 or 21 are driven into position through the roller 10, the inner points thereof, upon engagement with the nave 14, will be bent as indicated at 22 and clinch the contacts in place.

If preferred, the roller 10 may be constructed of a plurality of layers of insulating material. In Fig. 6 is illustrated a construction comprising an inner layer 10' and an outer layer 10", the latter being formed of tough, long-lasting material such as is used for tire treads; whereas the inner layer may be of either the same material or of a lower, cheaper grade. The layers 10', 10" may be telescoped one within the other, or they may be integrally molded.

Extending through the core 11 of the roller is the supporting bar 12, which is preferably formed of a metallic rod of circular cross-section, and of much smaller diameter than the bore of the hub member 15. This not only minimizes the friction between the roller 10 and the bar 12, but permits substantially free vertical and angular movement of the roller to quickly conform to the irregularities of the roadway as it passes rapidly along the same.

The ends of the bar 12 are bent to form arms 25 which terminate in eyes 26 to receive the end links 27 of chains 28 which connect the device to the vehicle, as illustrated in Figs. 1 and 2 of the drawings. In said figures, 30 indicates the body of the vehicle, such as an oil tank, supported upon the springs 31, and 32 the rear axle housing. The chains 28 are connected to any desired portion of the vehicle at widely, laterally spaced points, as illustrated in Fig. 2; and it should be noted that the arms 25 of the supporting bar, for a distance greater than that of the inner diameter or bore of the core 11, are slightly flared, and that the ends of the arms are preferably flared to a greater angle, as at 25', to substantially conform to the normal angle of the chains 28. The slight flare of the lower portion of the arms gives ample latitude for relative angular movement of the roller 10 on the bar 12, yet are sufficiently close to prevent the roller from riding up on the arms or onto the chains.

When the roller is travelling rapidly along a roadway, there is a tendency for the roller to bounce upwardly, laterally and angularly, especially when the road is uneven. This would normally tend to entangle the roller in the connecting chains, or upon the axle, springs or other under portions of the vehicle. This is largely avoided by the wide spacing of the connections of the upper ends of the chains to the vehicle; but such spacing does not eliminate kinking of the chains or entanglement of the roller with the chain. To avoid such conditions, a swivelled snap-hook 34 is interposed in each chain 28, and are preferably located adjacent the lower link 27. These snap-hooks also provide means for readily attaching and detaching the device when desired.

When the vehicle is empty, the body 30 will be raised by the springs 31 to the position illustrated in full lines in Fig. 1; and the chains 28 are of sufficient length to permit the roller 10 to engage the ground when the body 30 is at its greatest elevation, so that there will never be a time when the roller does not make effectual contact for grounding the vehicle.

With a grounding device as above described, the roller 10 will make proper contact with the ground under substantially all conditions, whether the vehicle is still or in motion, or whether loaded or empty. Should the vehicle be so tilted that the roller is raised too high for one end to engage the ground, the opposite end will always be able to make contact through the disc 17 on the lowermost end. Also, should the vehicle rest with the roller spanning a rut or hole, at least one of said end discs will engage the ground, and probably both; or one or more of the contact members 20 or 21 will make the contact.

While a preferred form of the invention is herein illustrated and described, it is to be understood that various changes may be made in the form and construction of the several parts of the device without departing from the scope of the invention as defined by the following claims.

I claim:

1. In a device of the class described, a ground-engaging roller comprising a cylindrical body of insulating material and having a longitudinal opening therethrough, a core for the cylindrical body consisting of a tubular metallic nave mounted within the opening and having its outer surface in fixed relation against the insulating material, a freely rotatable tubular metallic hub spaced adjacent the nave within the opening on which the nave is rotatably mounted, and a plurality of conductor elements extending from the periphery of said body to said nave.

2. A static grounding device for vehicles comprising a cylindrical roller of insulating material and having a longitudinal opening therethrough, a metallic tubular nave fixedly mounted within the longitudinal opening, a plurality of conductor elements extending through said roller from the peripheral face thereof and in engagement with said nave, a rotatable tubular hub disposed within the roller opening and in spaced contact with said nave, a flexible conductor extending through said hub and having the ends thereof connected at laterally spaced points to the vehicle, said flexible conductor including a bar upon which said hub rides, and arms on said bar limiting longitudinal movement of the roller on said flexible conductor.

3. A device as set forth in claim 2, in which said arms are outwardly flared to permit relative angular movement between said bar and said roller.

4. In a device of the class described, a ground-engaging roller comprising a cylindrical body of insulating material and an opening in the body, a metallic tubular nave within the body opening, a freely rotatable tubular metallic hub fitting the opening and having portions thereof in contact with the tubular nave, and a plurality of substantially triangular metallic conductor elements extending through said body from the periphery thereof to said nave, the bases of said triangular elements lying flush with the peripheral face of the body and the apexes thereof engaging said nave.

5. In a device of the class described, a ground-engaging roller comprising a cylindrical body of insulating material and having an opening therethrough, a core fitting said opening and consisting of a tubular metallic nave upon which said body is fixed, a freely rotatable tubular metallic hub, circumferential beads on said hub adjacent the ends thereof and upon which said nave and body rotatably ride, and conductor elements extending through said cylindrical body from the periphery thereof to said nave.

CLARENCE C. CRISS.

REFERENCES CITED

The following references are of record in the file of this patent:

UNITED STATES PATENTS

| Number | Name | Date |
|---|---|---|
| 1,735,258 | Melley | Nov. 12, 1929 |
| 1,797,545 | Churcher | Mar. 24, 1931 |
| 1,940,345 | Brownlee | Dec. 19, 1933 |
| 2,125,378 | Kadas | Aug. 2, 1938 |
| 2,216,363 | Crawford | Oct. 1, 1940 |